United States Patent [19]
Brois et al.

[11] Patent Number: 5,462,680
[45] Date of Patent: Oct. 31, 1995

[54] FREE RADICAL ADDUCTS OF FULLERENES WITH HYDROCARBONS AND POLYMERS

[75] Inventors: Stanley J. Brois; Abhimanyu O. Patil, both of Westfield; Wolfgang W. Schulz, Lebanon; Chang S. Hsu, Bridgewater; Richard T. Garner, Berkeley Heights, all of N.J.

[73] Assignee: Exxon Research & Engineering Co., Florham Park, N.J.

[21] Appl. No.: 229,510

[22] Filed: Apr. 19, 1994

[51] Int. Cl.$^6$ ................................................. C10M 127/00
[52] U.S. Cl. ................................. 252/9; 585/7; 585/11; 585/12; 585/13
[58] Field of Search ......................... 585/7, 10, 11, 585/12, 13

[56] References Cited

U.S. PATENT DOCUMENTS

| | | |
|---|---|---|
| 5,114,477 | 5/1992 | Mort . |
| 5,177,248 | 1/1993 | Chiang . |
| 5,234,475 | 8/1993 | Malhotra . |
| 5,258,048 | 11/1993 | Whewell . |
| 5,270,394 | 12/1993 | Hoxmeier . |
| 5,281,653 | 1/1994 | Thomann . |
| 5,292,444 | 3/1994 | Patil . |
| 5,292,813 | 3/1994 | Patil . |

OTHER PUBLICATIONS

Wu; Tetrahedron Letters, The International Journal for the Rapid Publication of Preliminary Communications in Organic Chemistry; "Ene Reaction of Fullerene $C_{60}$ and 4–Allylanisole . . . Introduction of Alkene to Buckminsterfullerene", pp. 919–922 Feb. 18, 1994.
Komatso Chemistry Letters, No. 3, pp. 635–636 (1994). Month unavailable.
Kamath, et al., SAE Technical Paper Series #922284, Int'l Fuels and Lubricants Meeting & Expo, S.F., Calif. pp. 29–35 (Oct. 19–22, 1992).
Krusic, et al., Science 22, 1183 (Nov. 1991).
Jeon, et al., Bull. Korean Chem. Soc. 12 (No. 6) 596 (1991). Month unavailable.
Samulski, et al., Chem. Mater. 4, 1153 (Nov. 1992). Lubricants Meeting & Expo, S.F. Calif. pp. 29–35 (Oct. 19–22, 1992).
Wang, et al., J.A.C.S. 1992, 114, pp. 9665–9666. Month unavailable.
Seshadri, et al., Tetrahedron Letters, 33(15) pp. 2069–2070 (1992). Month unavailable.
Hirsch, et al., Angew. Chem. Ed. Engl., Communications, 30(10), pp. 1309–1310 (1991). Month unavailable.
Wudl, et al., ACS Symposium—Chapter 11 (1992). Month unavailable.
Rao, et al., Indian Journal of Chemistry, 31(A&B), pp. F27–F31 (May 1992).
Loy, et al., J.A.C.S., 114, 3977, 3978 (1992). Month unavailable.

*Primary Examiner*—Jacqueline V. Howard
*Attorney, Agent, or Firm*—Linda M. Scuorzo

[57] ABSTRACT

This invention relates to novel compositions of matter comprising free radical adducts of a fullerene with one or more saturated hydrocarbons having a number average molecular weight ranging from about 200 to about ten million. Attachment of saturated hydrocarbons to as many as fourteen sites on the fullerene surface can be achieved via free radical initiated reactions. Fullerenes also add to saturated hydrocarbons with functional groups selected from the group consisting of hydroxy, carboxy, and carboalkoxy radicals in the presence of a free radical initiator. Said radical adducts of substantially saturated hydrocarbons with fullerenes react further with alkylamines and polyamines to produce new compositions. The radical adducts, and their aminated derivatives are useful as dispersants and viscosity modifiers in lubricants. In the presence of free radical initiators, said fullerenes can also crosslink substantially saturated polymers having number average molecular weight ranging from about 50,000 to about 500,000. The crosslinked polymers, are useful as new membranes and composites.

10 Claims, No Drawings

FREE RADICAL ADDUCTS OF FULLERENES WITH HYDROCARBONS AND POLYMERS

FIELD OF THE INVENTION

This invention relates to free radical adducts of fullerenes with certain saturated hydrocarbons and their derivatives.

BACKGROUND

The rapid pace of fullerene research is due in part to the commercial availability in 1990, of fullerene-laden raw soot, toluene extracts comprising mixture of $C_{60}$ and $C_{70}$, and purified $C_{60}$ and $C_{70}$. So far, there have been relatively few reports on the chemical modifications of fullerenes. An important aspect of the chemistry of fullerene relates to its behavior towards free radicals. With simple alkyl radicals such as isopropyl and t-butyl, $C_{60}$ appears to add a single alkyl radical to produce dimers via bonding between two fullerenes. By way of contrast, photolysis of di-t-butyl peroxide in toluene at 25° C., gives fullerene adducts containing 1 to 8 benzyl groups, while photolysis of di-t-butyl peroxide in benzene at 100° C. gives $C_{60}$ adducts bearing from 1 to at least 34 methyl groups derived from the radical initiator. Thermolysis of dibenzoyl peroxide at 110° C. gives $C_{60}$ adducts bearing from 1 to at least 11 phenyl groups. There is little structural evidence available on multiple adducts particularly regarding the integrity of the fullerene cage. Clearly, the capricious behavior of fullerenes towards radicals to date, has led to the formation of (a) dimers which readily dissociate, or (b) multiple adducts, and it is likely that other totally unanticipated aspects of radical-induced fullerene chemistry will surface.

Moreover, it is not clear as to whether unactivated long chain alkanes, or alkanes with polar groups would add to fullerenes in the presence of a decomposing free radical initiator, or for that matter whether macromolecules, especially saturated polyalkanes would add to fullerenes or rather undergo radical-induced degradation reactions. Furthermore, it is not known if the different steric requirements of long chain alkanes, and polyalkanes relative to simple alkyl groups, would impede adduct formation.

Also, there is no information regarding the chemical reactivity of the toluene insoluble portion of raw soot which contains higher order fullerenes ($C_{100}$–$C_{250}$).

SUMMARY OF THE INVENTION

The invention may suitably comprise, consist or consist essentially of the elements disclosed herein, and includes the products produced by the disclosed processes.

In the present invention, we have found that unactivated long chain alkane hydrocarbons, including saturated hydrocarbon polymers and lower molecular weight saturated hydrocarbons of form adducts with fullerenes (both toluene soluble fullerenes as well as toluene insoluble fullerene-laden soot) when reacted in the presence of a free radical reaction inducing amount of a free radical initiator. The adducts are produced by the process of reacting an saturated hydrocarbon, generally having an Mn of from about 200 to about 10 million with a fullerene in the presence of a radical initiator. Moreover, the radical initiators typically abstract at least one hydrogen from said alkane hydrocarbon to form free radicals that add to fullerenes in substantial numbers (e.g., from 1 up to about 14 per fullerene). Unstable, dissociating dimers are not observed. We believe that the alkane-bound fullerenes of the instant invention provide a new family of stable fullerene derivatives with useful multi-functional properties.

Thus, in one embodiment, the present invention relates to oil soluble radical adducts of fullerenes with one or more moles of an alkane hydrocarbon. The alkane substrates will preferably, be saturated, and have Mn values ranging from about 200 to about 10 million, more preferably to about 50,000. If desired, the reactants can contain a wide assortment of polar substituents which are compatible with the free radical grafting process. Hydrocarbons having Mn greater than about 500 are also typically referred to as polymers or polymeric hydrocarbons, and these terms will be used interchangeably herein.

In another embodiment of the present invention, the free radical derived from fullerenes and saturated alkane hydrocarbons can be reacted with a variety of nucleophilic reagents such as amines and polyamines, to produce aminated products which are useful as fuel and lube additives as well as multi-functional viscosity modifiers.

In yet another embodiment, the instant invention is directed to the formation of mixtures of oil soluble and crosslinked radical adducts of fullerenes and high molecular weight alkane hydrocarbon polymers having Mn values ranging from about 50,000 to about ten million. The degree of crosslinking in said mixtures is a sensitive function of polymer type, polymer molecular weight, reactant ratios, and reaction conditions.

With an appropriate choice of polymer type, Mn, reactant ratios, and reaction conditions, given the parameters disclosed herein one skilled in the art, can effectively design radical adducts of fullerenes and saturated hydrocarbons with varying crosslink densities, and create a novel class of fullerene-containing polymer networks useful in the design of separation membranes, gas transport media, metal complexes, and new composites and lube additives.

DETAILED DESCRIPTION OF THE INVENTION

The present invention relates to a new family of substituted fullerenes consisting of (a) oil soluble free radical adducts defined as fullerenes which are bonded to one or more alkane hydrocarbons having Mn values ranging from about 200 to about 20,000 which, if desired, can carry polar groups, and (b) reaction products of oil soluble free radical adducts reacted with nucleophilic reagents such as amines, and polyamines, and, (c) mixtures of oil soluble and crosslinked radical adducts formed by reacting a fullerene, a mixture of fullerenes, and/or a toluene insoluble fullerene soot, with polymeric alkane hydrocarbons having Mn values ranging from about 50,000 to about ten million in the presence of a free radical initiator.

FREE RADICAL ADDUCTS

Free radical adducts, particularly oil soluble free radical adducts of the instant invention are produced by contacting a fullerene, or a mixture of fullerenes, with an saturated hydrocarbon (i.e. alkane) having Mn values ranging from about 200 to about 10 million, more typically to about 20,000, using mole ratios of about 1:1 to about 1:100, respectively. Owing to the presence of a plurality of radical-acceptor sites on the fullerene surface, saturated hydrocarbon free radicals (R● wherein ● is an unpaired electron) having Mn values of about 200 to about 50,000 readily add to these multiple radical acceptor sites to produce star-like molecules having about 1 to about 12 arms (hydrocarbon and/or polymer chains). The number of arms in the steric requirements of the substituents on the surface of the emerging star-shaped structures.

On the other hand, we have found that high molecular weight polymeric alkane hydrocarbons (Mn≃50,000 and higher) with at least two free radical sites ($R^{\geq 2}\bullet$) created by the free radical initiator, typically add randomly to the multiple radical-acceptor sites on fullerenes to form crosslinked adducts. In solution, gels form and undergo swelling by the solvent, and typically said gels are insoluble in most solvents even at elevated temperatures of about 160° C. to about 200° C. We believe these crosslinked polymers are composed of infinite networks in which the polymer chains are crosslinked to each other at one or more sites via multiple bondings to fullerenes positioned so as to create stable macroscopic molecules. Depending on polymer type, Mn, reactant ratios, and reaction conditions, oil soluble and/or crosslinked polymers can be tailored to meet a specific end use.

FULLERENES

Structurally, fullerenes are composed solely of carbon atoms arranged over the surface of a closed hollow cage. For example $C_{60}$ is a fullerene having a spheroidal shape, and each atom is linked to its three nearest neighbors by bonds which define a polyhedral network. This network consists of 12 pentagons, and n hexagons, where n can be any whole number except one.

Mixtures of fullerenes can be produced by high temperature reactions of elemental carbon or of carbon-containing species by processes known to those skilled in the art. In each case, carbonaceous deposits or soot is produced which contains fullerenes. Extraction of this soot with toluene, for example, gives a mixture of fullerenes, whose composition varies with the method of preparation. A typical composition contains about 80% $C_{60}$, 19% $C_{70}$, and about 1% of many different higher fullerenes.

Fullerenes including $C_{60}$, $C_{70}$, $C_{78}$, $C_{84}$, $C_{96}$, $C_{120}$, and larger and mixtures thereof may be used in the process of the present invention. If pure fullerenes are required, the mixtures can be separated by known methods such as high performance liquid chromatography (HPLC). In addition, the toluene insoluble portion of raw soot, which contains higher order fullerenes ($C_{100-C250}$), has been found useful in producing radical adducts.

FREE RADICAL INITIATORS

Free radical initiators used in forming the radical adducts of this invention include dialkyl peroxides such as di-tertiary-butyl peroxide, 2,5-dimethyl-2, 5-di-tertiary-butyl-peroxyhexane, di-cumyl peroxide; alkyl peroxides such as tertiary-butyl hydroperoxide, tertiary-octyl hydroperoxide, cumene hydroperoxide; aroyl peroxides such as benzoyl peroxide; peroxyl esters such as tertiary-butyl peroxypivalate, tertiary-butyl perbenzoate; and also compounds such as azo-bis-isobutyronitrile. Any free radical initiator with a suitable half life at reaction temperatures of from about 80° C. to about 200° C. can be used; moreover, shear-induced and ionizing radiation-induced radical formation can be useful.

LOWER MOLECULAR WEIGHT HYDROCARBON REACTANTS

The radical-initiated additions of saturated hydrocarbons within the Mn ranges specified herein to fullerenes to provide oil soluble adducts, can be applied to a wide spectrum of alkane hydrocarbons, such as those selected from the group consisting of normal alkanes such as decane, hexadecane, octadecane, tricosane, and paraffins having 10 to about 40 carbons; branched alkanes such as trimethyldecane, tetramethylpentadecane (pristane); squalane, white oils, Nujols, mineral oils, hydrogenated oligomers and co-oligomers of ethylene, propylene, butylene and higher molecular weight olefins consisting of normal and branched alkanes with 10 to about 40 carbons. These may feature one or more functional groups such as OH, OR, $O(CH_2CH_2O)_xH$ (wherein x is an integer ranging from one to about ten), CN, COOH, $COOR_a$, $C(=O)R_a$ (wherein Ra is alkyl having one to about 18 carbons), aryl, and ethylenically unsaturated groups. Typical examples of useful substituted hydrocarbons comprise decanol, octadecanol, ethoxylated octadecanol, stearic acid, ethyl stearate, methyl decyl ketone, tetrapropylenebenzene, and polyesters.

POLYMERIC HYDROCARBON REACTANTS

Useful polymeric hydrocarbons which can be used to form oil soluble radical adducts with a fullerene, or a mixture of fullerenes range in number average molecular weight (Mn) from about 500 to about 20,000, and include but are not limited to polymers derived from one or more of the following monomers: ethylene, propylene, butenes, higher alpha-olefins, styrene, allyl esters, vinyl esters such as vinyl acetate, acrylic acid, acrylonitrile, and the like. Included are: homopolymers of ethylene, propylene, butene, isobutylene, and higher alpha-olefins; copolymers of ethylene with propylene; copolymers of ethylene with butenes or higher alpha-olefins; and copolymers of propylene with butenes, and higher alpha-olefins.

Specific examples of suitable hydrocarbon polymers include homopolymers and copolymers of one or more monomers of $C_2$ to $C_{30}$, e.g., $C_2$ to $C_8$ olefins, including both alpha-olefins and internal olefins, which may be straight or branched, al iphatic, aromatic, alkylaromatic, and cycloaliphatic. Included among these are polymers of ethylene with $C_3$ to $C_{30}$ olefins, preferably copolymers of ethylene and propylene. Also included are polymers of butene, isobutylene, polymers and copolymers of $C_6$ and higher alpha-olefins, particularly useful examples being polybutenes, polyisobutylenes, copolymers of propylene and isobutylene, copolymers of isobutylene and butadiene, and the like. Polymers can be prepared from ethylene and ethylenically unsaturated hydrocarbons including cyclic, alicyclic and acyclic materials containing from 3 to 28 carbon atoms, e.g., 2 to 18 carbon atoms. These ethylene copolymers may on average contain from about an average of 15 to 90 wt. % ethylene, preferably about an average of 30 to 80 wt. % of ethylene, and about an average of 10 to 85 wt. % and preferably about an average of 20 to 70 wt. % of one or more $C_3$ to $C_8$ alpha-olefins. Other preferred polymers as precursors to additives with effective dispersancy properties, are homopolymers of isobutylene, and copolymers of ethylene with one or more $C_3$ to $C_{10}$ monoolefins. Examples of such monoolefins are propylene, butylene, pentene, octene-1, and styrene. These polymers will usually have Mn values within the range of from about 700 to about 5,000 more particularly between about 1,000 and about 3,000.

Since hydrocarbons, particularly polymeric hydrocarbons containing excess ethylenic unsaturation are prone to crosslinking reactions between polymer chains during radical grafting of fullerenes, polymers containing no or only residual levels of unsaturation are preferred. Similarly, when dienes are used in copolymer formation, the resulting polymers are preferably hydrogenated to saturate all or substantially all of the ethylenic unsaturation.

CROSSLINKED POLYMERS

The radical-induced addition of saturated polymers having Mn values of about 50,000 to fullerenes gives mixtures of oil soluble and crosslinked radical adducts. Hydrogenated random polymers of butadiene and/or isoprene and polymers of isoprene and/or butadiene and styrene may be used. Typical block copolymers include hydrogenated polystyrene-polyisoprene, polystyrene-polybutadiene, polyvinyl cyclohexane-polyisoprene, and polyvinyl cyclohexane-polybutadiene. Tapered polymers include those of the foregoing monomers prepared by methods known in the art. Useful polymers include hydrogenated styrene-butadiene block and tapered copolymers. Suitable normal block copolymers include hydrogenated styrene-isoprene block copolymers. Hydrogenated star branched polyisoprene polymers known in the art also may be used. Especially preferred hydrogenated polymers for producing crosslinked free radical adducts with effective amounts of fullerenes, include terpolymers and tetrapolymers of ethylene, and $C_3$ to $C_{28}$ alpha-olefins.

Other suitable polymeric hydrocarbons include polyethylene, hydrogenated homopolymers, and random, tapered or block polymers (copolymers, including terpolymers, and tetrapolymers) of conjugated dienes and/or monovinyl aromatic compounds with, optionally, alpha-olefins or lower alkenes e.g., $C_3$ to $C_{18}$ alpha-olefins or lower alkenes.

ADDUCT FORMATION

Oil Soluble Adducts

Oil soluble free radical adducts of the present invention can be prepared by various processes in which the alkane hydrocarbon Mn≈500 to about 50,000, and an optimal concentration of fullerene or mixture of fullerenes, are intimately mixed in the presence of a free radical initiator, and reacted at a temperature which facilitates free radical addition, which ordinarily occurs at, or close to, the decomposition temperature of the radical initiator. Thus, reaction temperatures generally fall within the range of from 80° to 220° C., preferably from 100° C. to 200° C., and more preferably from 120° to about 180° C. The optimal reaction temperature will depend primarily upon the free radical initiators that are employed in the fullerene grafting reactions. Reaction times of from about 1 minute to about 12 hours are feasible. Up to about 5 wt % of a fullerene or mixture of fullerenes based on polymer weight may be used. Greater amounts are, however, also suitable. The amount of free radical initiator used is generally between 1 and 1000 wt % based on the weight of fullerene, and depends upon the nature of the free radical initiator, and saturated hydrocarbon substrate being grafted. Certain polymers are susceptible to undergo crosslinking and/or chain scission, and thus reagent concentrations, time, temperature, and process conditions should be chosen and monitored accordingly during the grafting process. Balancing these parameters should help to retain the integrity of the polymer during radical grafting. Ordinarily, grafting processes which use from about 10 wt % to about 50 wt % levels of free radical initiator, at grafting temperatures ranging from about 80° C. to about 180° C., in an oxygen-free reactor can produce functionalized polymers with significant levels of appended fullerenes. The level of functionality affects the design of dispersants with optimal viscometrics, and performance, and the radical process of the present invention allows one skilled in the art to tailor a functional polymer for specific fuel and lube uses. The compositions can be made, for example by combining a major amount of an oleaginous substance and a minor amount of a viscosity improving amount of the radical adduct of a fullerene and a saturated hydrocarbon having a number average molecular weight of from about of from about 200 to about 10 million. Suitable amounts of hydrocarbon would include from about I to about 14 moles of saturated hydrocarbon.

In general, the amount of fullerene employed is dictated by the level of functionality desired in radical adducts while still maintaining sufficient oil solubility. Levels of radical grafting onto the hydrocarbon ranging from about 1 to about 20 hydrocarbon chains or more typically 1 to about 12 chains per fullerene are useful. However, the optimal level of fullerene functionality as indicated before, is usually dictated by a suitable degree of oil solubility.

Functionality levels leading to desirable crosslinking are preferred when designing new membranes or composites. For example, useful membranes can be designed by grafting from about 5–20 wt. % of fullerene onto a high molecular weight hydrocarbon such as EP and polyethylene having an Mn in the range of about 50,000 to about 500,000.

The multiple radical addition of saturated hydrocarbons to fullerenes permits the facile design of a wide range of star-like fullerenes bearing hydrocarbyl and substituted hydrocarbyl groups.

Intimate mixing of the alkane and fullerene reactants can be readily achieved by contacting these reactants in the presence of a free radical initiator, without solvent (neat), in the melt with the aid of a masticator or extruder, or in solution.

Neat

Radical grafting of saturated hydrocarbons, with fullerenes may be conducted without a solvent. For example, a neat hydrocarbon such as pristane, or a neat poly-alpha-olefin basestock, and about up to 5 wt. % of a fullerene, or mixture of fullerenes, are combined in a nitrogen-blanketed reactor. Radical grafting can be initiated by adding in one dose, from about 1 to about 100, more typically from ten to a wt. % of a free radical initiator such as t-butyl peroxide for example, and stirring until IR analysis of the reaction mixture indicates that radical grafting is complete.

Melt

Radical grafting of saturated hydrocarbons may also be conducted without a solvent, in a melt. To this end, polymer processing equipment such as a rubber mill, an extruder, a Banbury mixer, Brabender mixer, and the like are used. For example, a saturated polymer such as ethylene propylene (EP) copolymer (Mn≈50,000) is charged into a Braebender melt mixer at a temperature of about 100°–180° C. under moderate mixing conditions. A fullerene such as $C_{60}$, or a mixture of fullerenes such as toluene extract containing 85 wt % of $C_{60}$, and 15 wt % of $C_{70}$ is added (about 1-5 wt % based on polymer weight). A radical initiator such as t-butyl peroxide (10–100 wt. % based wt % of polymer) is added with mixing. After mixing for about 5 to 60 minutes, or until IR analysis confirms complete fullerene utilization, the functionalized polymer may be dissolved in heptane. The addition of the heptane solution of the radical adduct to a large volume of precipitating agent effectively precipitates the radical adduct. After repeating this procedure, the fullerene-modified polymer can be vacuum dried and analyzed by UV-GPC analysis to ascertain the Mn of the fullerene-modified polymer. The melt functionalization protocol for producing radical adducts is quite general, and is applicable to a wide range of polymers, copolymers, block and graft copolymers.

The fullerene-modified polymers are useful in their own right as additives, but can be aminated with amines such as butylamine, octylamine, decylamine tetradecylamine and octadecylamine or with polyamines such as N-(3-aminopropyl) morpholine, tetraethylenepentamine or 3-(dimethylamino)-propylamine in the melt, or in solution to produce dispersant-viscosity modifiers for use in lubricants.

Solution

Typically, when grafting in solution, a hydrocarbon of the types previously mentioned can be dissolved in a suitable solvent, such as chlorobenzene, dichlorobenzene, or mineral oil, and heated to temperatures ranging from about 90° to about 180° C. depending upon the radical initiator used. The fullerene or mixture of fullerenes, is added and the reaction mixture heated at below the decomposition temperature of the free radical initiator. At this point, the radical initiator is added in one dose, or dropwise over a suitable time span, usually from about 5 to 60 minutes. Another option is to add a mixture of fullerene and radical initiator in a suitable solvent to the hydrocarbon solution at an addition rate and suitable reaction temperature consistent with the half life of the radical initiator. The reaction mixture is heated, with stirring, until infrared analysis, and/or NMR analysis indicate that the radical addition of the fullerene to the hydrocarbon is complete.

When necessary, functionalized products can be isolated by solvent removal using evaporative techniques, or in the case of oil soluble polymers, by adding the reaction mixture to a polar solvent (such as acetone or methanol) which will induce precipitation of the functional ized polymer.

Crosslinked Adducts

Any of the above synthetic protocols can be applied to the preparation of crosslinked radical adducts of fullerenes and saturated hydrocarbons with Mn values of about 50,000 to about 500,000. Generally, for example polyethylene and EP copolymer when reacted with about 1 to about 5 wt % of a fullerene the presence of a free radical initiator (from about 1 to about 1000 wt % based on fullerene weight) will produce oil soluble and/or crosslinked radical adducts.

By appropriate choice of polymer, Mn, reactant ratios and conditions within the ranges disclosed above, one skilled in the art can, with the aid of the process options defined above, design oil soluble adducts of fullerenes and saturated hydrocarbons for use as lube additives, and mixtures of oil soluble and crosslinked adducts of fullerenes and saturated high molecular weight polymers for use as membranes, and novel composites.

This invention will be further understood by reference to the following examples, which include preferred embodiment. All molecular weights are number average molecular weights (Mn) and are accurate to within about ±5–10% as denoted by the term, "Mn≈", in the appropriate examples. All temperatures are in degrees Centigrade (° C.).

The following examples exemplify the preparation of the free radical adducts and derivatives used in accordance with the present invention.

EXAMPLES

Hydrocarbons

Example 1 - Adduct of n-Decane and $C_{613}$ Fullerene

Ten grams of n-decane and 0.1 gram of $C_{60}$ fullerene were combined and stirred in a nitrogen-purged reaction at about 160° for 10 minutes. Radical grafting of the n-decane onto the fullerene was initiated by the addition of 0.25 ml of di-t-butyl peroxide to the reaction mixture in one dose, and stirring was continued at about a residue which featured a UV-GPC with a UV-active peak corresponding to a substituted fullerene bearing approximately 12 decyl groups.

Example 2 - Adduct of nonanol and $C_{60}$ Fullerene

Ten grams of n-nonanol and 0.1 gram of $C_{60}$ fullerene were combined and stirred in a nitrogen-blanketed reactor at about 160° for 10 minutes. Radical grafting of the n-nonanol onto the fullerene was initiated by the addition of 0.25 ml of di-t-butyl peroxide to the reaction mixture in one dose, and stirring was continued at about 160° for about 2 hours. Rotoevaporation of the reaction mixture gave a residue which featured a UV-GPC with a UV-active peak corresponding to a substituted fullerene bearing on average approximately 12 hydroxy-nonyl groups.

Example 3 - Adduct of Pristane and a Fullerene Mixture

Ten grams of 2, 6, 10, 14-tetramethyl-pentadecane (pristane), and 0.1 gram of fullerenes (toluene extract comprising about 85 wt % $C_{60}$, and about 15 wt % $C_{70}$) were combined and stirred in a nitrogen-blanketed reactor at about 160° for 10 minutes. Radical grafting of the pristane onto the fullerenes was initiated by the addition of 0.25 ml of di-t-butyl peroxide to the reaction mixture in one dose, and stirring was continued at about 160° for about 2 hours. Rotoevaporation of the reaction mixture gave a residue which featured a UV-GPC with a UV-active peak a retention time of about 27 minutes corresponding to a substituted fullerene bearing approximately 6 pristyl groups. Field desorption MS of the residue showed a distribution of 2–12 peaks with the base peak at m/z=2885. The 12 peaks correspond to $C_{60}$ substituted with from 1 to about 12 pristyl groups.

Polymers

Example 4 - Adduct of polydecene-1 and Fullerene Mixture

A mixture of 100 grams of hydrogenated polydecene-1 ($M_n \approx 4,000$) and 0.5 gram of fullerene (extract from toluene comprising a mixture of about 85 wt % $C_{60}$, and about 15 wt % $C_{70}$) was charged into a nitrogen purged reactor and stirred at 160°. A half ml of di-t-butyl peroxide was added in one dose and the reaction mixture stirred at 160° for about 2 hours. UV-GPC scans of the reaction product showed a radical adduct peak (16 minutes retention time) with an intense UV absorption, and showing an Mn of about 50,000 corresponding to a mixture of poly-substituted fullerenes bearing approximately 12 arms (poly-n-decyl groups).

Example 5 - Adduct of Ethylene Butene (EB) Copolymer and $C_{60}$ Fullerene

About 6.2 grams of ethylene butene (EB) copolymer with Mn≃9,000 and 70% butylene, 40 mg of $C_{60}$, and 2 ml of xylene were combined in a nitrogen-blanketed reactor, and heated to 140° C. After an hour, one ml of di-t-butyl peroxide was added dropwise over a 15 minute span. After refluxing for an hour, the mixture was diluted in heptane, filtered, and concentrated by rotoevaporation. Unlike $C_{60}$, the product was soluble in hexane, and tetrahydrofuran (THF). The IR spectrum of the product showed that the characteristic absorption bands ascribable to $C_{60}$ at 527, and 578 cm-1 were conspicuously absent. GPC analysis showed Mn≃55,300, which corresponded to a radical adduct with about 6 arms (EB copolymer chains).

Example 6 - Modification of Ethylene Propylene (EP) copolymer with $C_{60}$ Fullerene One gram of EP copolymer (Mn≃50,000 and 65% propylene) dissolved in 80 grams of dichlorobenzene (DCB), and 0.5 gram of a fullerene mixture (85 wt % $C_{60}$, and 15 wt % $C_{70}$) dissolved in about 100 grams of DCB were combined in a nitrogen-purged reactor, and stirred at 160°. Approximately 0.25 ml of di-t-butyl peroxide was added in one dose, and the mixture was stirred at 160° for about two hours. Addition of the cooled mixture to a liter of acetone precipitated the functionalized polymer, which was then dissolved in cyclohexane and reprecipitated from acetone. A THF solution of the dried polymer featured a UV-GPC with a broad UV-active peak.

Example 7 - Reaction of Styrene/allyl Alcohol Copolymer with Fullerenes

In a 100 ml three-necked flask fitted with stirrer, reflux condenser and nitrogen inlet, took 1 g of styrene/allyl alcohol copolymer and was dissolved in 20 ml xylene (hydroxy contain 5.4 to 6%, Scientific Polymer Products, Inc.). 20 mg of fullerene mixture (about 85% $C_{60}$, about 14% $C_{70}$, about 1% higher fullerenes) (2.0 wt %) was added. The solution was heated to 140° C. and then 0.5 g of di-t-butylperoxide was added slowly under nitrogen. The solution was stirred at that temperature for 30 minutes. Part of the solvent was removed on rotary evaporator and remaining was precipitated with acetone. The red product is completely soluble in THF.

Example 8 - Reaction of Fullerenes-styrene/allyl Alcohol Copolymer Adduct with N, N-dimethylaminopropylamine 0.02 g fullerene-styrene/allyl alcohol adduct was dissolved in 20 ml xylene and was mixed with 1 g of N, N-dimethylaminopropylamine. The solution was heated at 100° C. for 6 hours. The solvent was removed on rotary evaporator and the product was precipitated with dry acetone, filtered. The product was dried under vacuum. N %=0.30.

Example 9 - Crosslinking EP copolymer with Fullerenes

Ten grams of EP copolymer (Mn=50,000 with 65 wt % propylene) were dissolved in about 90 grams of dichlorobenzene (DCB) by stirring the mixture at 80° for about 12 hours in a nitrogen blanketed reactor. About 100 mg of fullerenes (about 85 wt % $C_{60}$, 14 wt % about $C_{70}$ and about 1% higher fullerenes) were added in one portion to the polymer solution. After a half hour, the fullerenes dissolved to give a dark solution. 0.5 grams of di-t-butyl peroxide was added in one dose to the stirred solution at 160°. Within two minutes, the solution became viscous, and the polymer separated from solution and began to climb up the stirrer shaft. Mixing was stopped, and about 100 grams of DCB were added to the reaction mixture. Stirring for about 3 hours at 140° failed to dissolve the gelled polymer. After cooling the reactor, the colorless solvent was decanted, and the polymer was removed from the reactor with a spatula. Solubility tests indicated that the EP polymer was substantially crosslinked.

Example 10 - Reaction of EP copolymer with Fullerene Extract

A mixture of 5 grams of EP copolymer of Example 8 and 5 grams of atactic polypropylene with Mn≃150 was dissolved in 90 grams of DCB in a nitrogen-sparged reactor stirred at 160° C. About 0.2 gram of fullerene extract of Example 8 was dissolved in 100 grams of DCB and added to the polymer solution at 160° C. The stirred solution was treated with 0.25 ml of di-t-butyl peroxide in one dose at 160° C. After 2 minutes, the polymer began separating from solution, and ascended the stirrer staff. Stirring was stopped, and mixture cooled. Solubility tests indicated that the polymer mixture was crosslinked.

Example 11 - Melt Functionalization of Fullerenes with EP Copolymer

EP copolymer (Mn=50,000 with 65 wt % propylene), di-t-butyl peroxide (DIBP), and $C_{60}$ were mixed on a 3"×6" two roll reactor (two roll mill) at room temperature. During mixing, the temperature increased to about 40° due to the shear action of milling. The sample was then compression molded at about 180° for about 60 minutes. Tensile specimens were formed from the compression molded pad, and stress-strain properties were measured. The test sample showed a Young's modulus of 1831.3 MPa, a 370% elongation at break, and a tensile strength of 992.88 kPa. The data clearly indicated that the fullerenated polymer was crosslinked, and that the higher the temperature or the longer the cure time, the more crosslinked the sample became. The degree of swelling was also measured on this sample using toluene and heptane as the solvents. The sample for swelling was prepared from the compression molded tensile pad. The swelling and the efficiency of the crosslinking procedure itself. To accomplish this, the sample was swollen to equilibrium and the swelling ratio determined, as well as the level of the extractable components. The results in toluene followed the tensile data closely and showed a volume swell of 504.5%, 6.9% solubles, and a crosslink density of 73.6 micromol/cc. The radical adducts of EP and fullerene were extensively crosslinked as evidenced by their virtual insolubility in any of the solvents tested. Moreover, the solvents were not visibly discolored as expected if any of the fullerenes were extracted.

In the second series of experiments, dicumyl peroxide (DICUP) replaced DIBP, and the fullerenes included the toluene insoluble portion of the fullerene soot. This sample was compression molded at about 150° for approximately 60 minutes. The test sample showed a Young's modulus of 1716.86 MPa, a 282.3% elongation at break, and a tensile strength of 1.36 MPa. In addition, the sample showed a volume swell of 438%, 8.8% solubles, and a crosslink density of 96.8 micromol/cc. The data indicated that $C_{60}$ fullerene, and the toluene insoluble portion of the fullerene soot clearly took part in the crosslinking of EP rubber, and that this substrate was a saturated elastomer.

Example 12 - Crosslinking polyethylene with Fullerenes

About ten grams of high density polyethylene (MFR=8) were dissolved in about 90 grams of DCB by refluxing the mixture for about seven hours. About 200 mgs of fullerene extract were dissolved in the polymer solution by heating the mixture for 5 hours at 160° C. Then, a half ml of di-t-butyl peroxide was added in one dose to the stirred solution at 160°. After about 4 minutes, the solution thickened, and the fullerenated polymer separated from the DCB solution, and climbed up the stirrer shaft. Solubility tests indicated that the fullerenated polyethylene product was crosslinked.

What is claimed is:

1. A composition comprising a free radical adduct of a fullerene and one to about 14 mole of a hydrocarbon selected from the group consisting of substituted and unsubstituted hydrocarbons having alkane saturations, said hydrocarbon having a number average molecular weight of about to about 10 million.

2. The free radical adduct of claim 1 wherein a hydrocarbon has an $M_n$ of about 200 to about 50,000, and the adduct is oil soluble.

3. The composition of claim 1 wherein the substituted or unsubstituted hydrocarbon is selected from the group consisting of hexadecane, octadecane, tricosane, paraffins, tetramethylpentadecane, squalane, white oils, Nujols, mineral oils, hydrogenated oligomers and co-oligomers of ethylene, propylene, butylene and higher molecular weight olefin oligomers, octadecanol, ethoxylated octadecanol, stearic acid, ethyl stearate, and polyesters.

4. The composition of claim 1 wherein the hydrocarbon is a polymer having a number average molecular weight ranging from about 500 to 20,000.

5. The composition of claim 1 wherein the hydrocarbon is a polymer having a number average molecular weight ranging from about 50,000 to 500,000.

6. A composition comprising a crosslinked free radical adduct of a fullerene and a substantially saturated polymer having a number average molecular weight of about 50,000 to about 10 million.

7. A composition comprising the reaction product of a fullerene, a saturated hydrocarbon having a number average molecular weight of about 200 to about 10 million and a reaction inducing amount of a free radical initiator.

8. A composition comprising products formed by reacting the adduct of claim 1 with a reagent selected from the group consisting of amines.

9. A composition comprising a major amount of oleaginous substance and a minor amount of a viscosity improving amount of radical adduct of a fullerene and about one to about fourteen moles saturated hydrocarbon having a number average molecular weight from about 200 to about 10 million.

10. The composition of claim 9 wherein the oleaginous substance is selected from the group consisting of diesel engine oils, gasoline engine oils, aviation engine oils, two cycle engine oils, gear oils, roll oils, compressor oils, transformer oils, switch oils, steam turbine oils, synthetic oils, industrial oils, cutting oils, pneumatic tool oils, refrigerator oils, electrical oils, vegetable oils, mineral oils, automatic transmission fluids, power transmission fluids, brake fluids, power steering fluids, hydraulic fluids, functional fluids, traction fluids, bearing lubricants, metal working lubricants, extreme pressure lubricants, solid lubricants, ester lubricants, and greases.

\* \* \* \* \*